F. H. C. STOLL.
LITTER CARRIER.
APPLICATION FILED MAR. 5, 1913.

1,076,169.  Patented Oct. 21, 1913.

WITNESSES:
D. E. Carlsen
O. E. Carlsen

INVENTOR:
Frank H. C. Stoll,
BY HIS ATTORNEY:
A. M. Carlsen

UNITED STATES PATENT OFFICE.

FRANK H. C. STOLL, OF ATWATER, MINNESOTA.

LITTER-CARRIER.

1,076,169.

Specification of Letters Patent.

Patented Oct. 21, 1913.

Application filed March 5, 1913. Serial No. 752,050.

*To all whom it may concern:*

Be it known that I, FRANK H. C. STOLL, a citizen of the United States, residing at Atwater, in the county of Kandiyohi and State of Minnesota, have invented a new and useful Litter-Carrier, of which the following is a specification.

My invention relates to overhead carriers for conveying litter and the like, and its object is to provide a device of this character which is absolutely sure to trip and discharge its contents at the desired place.

Figure 1:
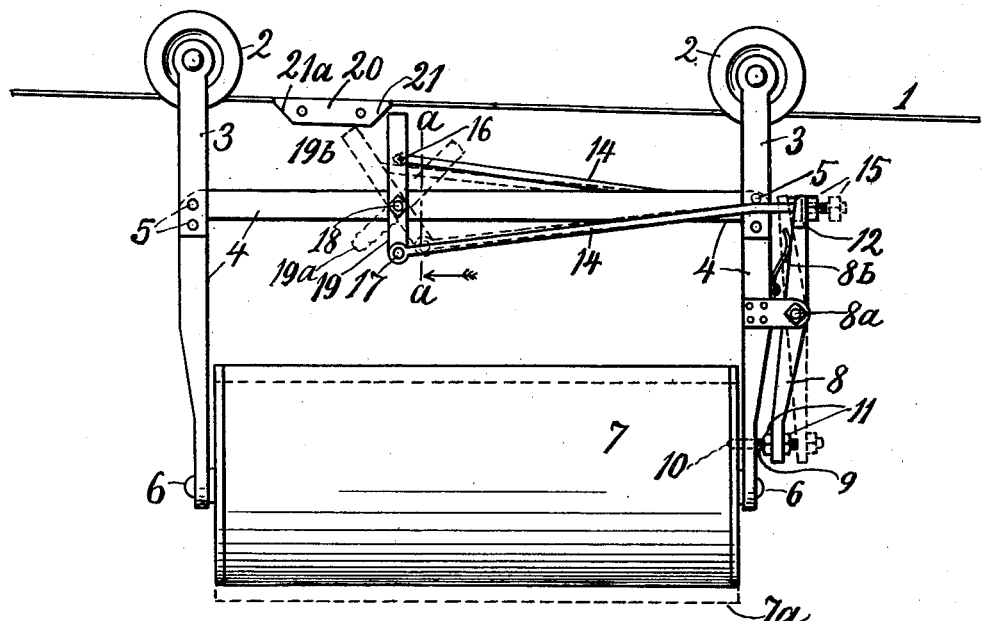
Figures 2, 3:
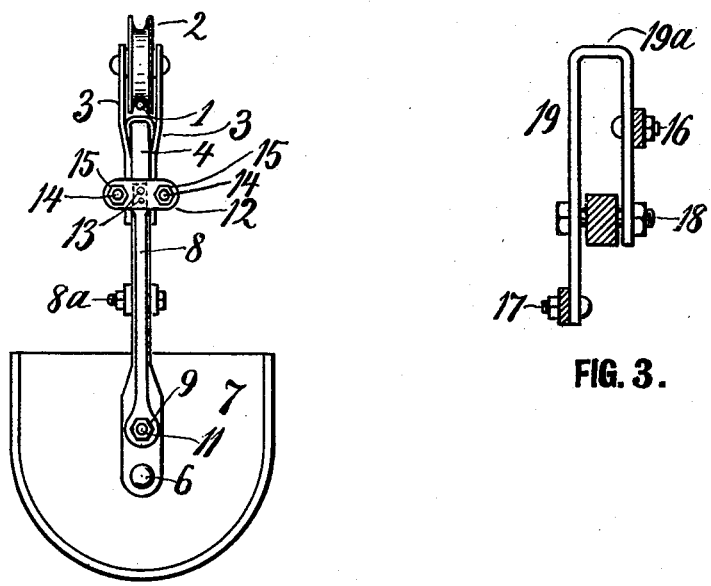

In the accompanying drawing, Figure 1 is a side elevation of a litter carrier mounted on a cable and embodying my invention. Fig. 2 is a right hand end elevation of what is shown in Fig. 1. Fig. 3 is an enlarged section on the line *a—a* Fig. 1.

Referring to the drawing by reference numerals, 1 designates a portion of an enlarged cable or rail adapted to be secured with its lowest end to a stationary object near the stable from which the litter is to be removed, and to have its highest end fixed to a post or other high stationary object beyond the dumping ground for the litter. Upon said cable are mounted the grooved sheaves or wheels 2, from which depend two hangers 3, 3, which may be made integral with an inverted U-shaped frame 4, or they may be secured to the frame as shown at 5 in Fig. 1.

Trunnioned at 6 in the downward arms of the frame is a receptacle 7, which is held in its normal position by a locking lever 8, which is fulcrumed at $8^a$ to the frame 4 and provided with a prong 9 passed through the frame and engaging in a cavity 10 in the end of the receptacle; said prong having a screw-threaded portion inserted in the lever 8 and provided with nuts 11 making the prong adjustable as to its engagement with the receptacle. The upper end of the lever 8 is normally held outward by a spring $8^b$ and is provided with a flat portion 12, which may be either integral with the lever or secured thereto by screws or rivets 13 (shown in Fig. 2). Said flat portion 12 is provided with two apertures in which are slidably inserted two rods 14, each rod provided with an adjustment nut 15 at the outer side of the lever. The other ends of said rods are pivotally connected at 16 and 17 one above and the other below the fulcrum 18 of an inverted U-shaped trip lever 19, which is fulcrumed near the middle of the horizontal top bar of the frame 4. The rods 14 are arranged one at each side of the frame 4 and (as best shown in Fig. 3) are pivoted one to each arm of the lever 19. The upper or top loop $19^a$ of the trip lever 19 is arranged for contact with a trip block 20 which is adjustably secured on the cable 1, from whose lower side it projects and is provided with inclined end faces 21, $21^a$.

In the operation of the device, the receptacle is filled with litter or other stuff to be moved; the operator then gives the device a sufficient push to make it move toward the higher end of the cable at least as far as to the trip 20, when said trip is engaged the trip lever will tip to the position shown by the dotted lines $7^a$ and the lower rod 14 will cause the locking lever 8 to disengage the receptacle 7 and the latter being heaviest above its trunnions will trip to one side and, by turning as shown by the dotted lines $7^a$, bottom up, will discharge its contents. Quite often it happens, however, in this kind of arrangements that the speed of the frame 4 and the receptacle, is so great that the lever 19 may pass the trip 20 and be restored again to vertical position and the prong 9 locks again by the spring $18^b$, before the receptacle has had time to start on its dumping operation. When this happens and the carriage returns slowly down the incline of the cable, the end or face $21^a$ of the trip 20 will tilt the trip lever to the position $19^b$ and thus operate the upper rod 14 and cause the unlocking of the prong 9 so slowly that the receptacle can not fail to dump. When the device is returned to the original starting point, the receptacle is locked in its upstanding position and filled and sent out again as often as necessary.

By the above description it will be seen that by my invention an entirely safe and sure trip mechanism is provided in the class of carriers referred to.

What I claim is:—

1. In a carrier of the class described, the combination of an overhead cable or track, a trip secured to the under side thereof, a frame having a longitudinal top bar with upward and downward arms at each end thereof, a grooved wheel mounted on each of the upper arms and arranged to roll on the cable, a receptacle trunnioned between the downward arms, a locking lever fulcrumed to one of the downward arms and having a broad upper end with two apertures therein, and near its lower end a prong passed through the arm of the frame and engaging the end of the receptacle, the latter having a cavity for the prong to enter, a spring arranged to hold the locking lever with said prong normally engaged; a normally vertically disposed trip lever fulcrumed on the top bar of the frame and having its upper end arranged to contact with the trip on the cable when the frame moves in either direction below the trip; two rods pivoted each with one end to the trip lever, one above and the other below the fulcrum of the lever, the other ends of said rods being slidably inserted in the apertures of the locking lever and provided with means to prevent their withdrawal therefrom and to hold the trip lever normally in vertical position.

2. in combination, a cable or like track, a trip secured thereto, a frame composed of a longitudinal top bar and arms extending upward and downward at each end thereof, a grooved track wheel mounted on each of the upward arms and arranged to roll on the track, a receptacle trunnioned between the downward arms, a locking lever fulcrumed at one end of the frame and having a prong arranged to engage the adjacent end of the receptacle, said end having a cavity for the prong to engage, means for adjusting the prong to more or less engagement with the receptacle, a spring acting on the lever to hold the prong normally engaged; said lever having its upper end broadened and provided with two apertures; a normally vertically disposed trip lever fulcrumed to the top bar of the frame and adapted to be engaged with the trip when the frame moves in either direction along the cable, two rods pivoted each with one end to the trip lever, one above and the other below the fulcrum thereof, one at each side of the lever, and having their other ends passed one at each side of the frame and slidingly inserted in the apertures of the locking lever, and adjustable means on said rods for engaging the outer side of the locking lever to prevent withdrawal of the rods and to hold the trip lever in vertical position when the spring holds the locking lever in locked position.

In testimony whereof I affix my signature, in presence of two witnesses.

FRANK H. C. STOLL.

Witnesses:
 ALFRED O. PARSONS,
 CHAS. A. RIEGEL.

---

Copies of this patent may be obtained for five cents each, by addressing the "Commissioner of Patents, Washington, D. C."